United States Patent [19]

Sterki

[11] 4,356,556
[45] Oct. 26, 1982

[54] METHOD OF DETERMINING THE BOUNDARIES OF A MEASURING PATH OF A GEAR FLANK TESTING APPARATUS AND GEAR FLANK TESTING APPARATUS FOR PERFORMANCE OF THE METHOD

[75] Inventor: Armin Sterki, Uetikon, Switzerland

[73] Assignee: Maag Gear-Wheel & Machine Co. Ltd., Zürich, Switzerland

[21] Appl. No.: 188,843

[22] Filed: Sep. 18, 1980

[30] Foreign Application Priority Data

Oct. 11, 1979 [CH] Switzerland ............... 9184/79

[51] Int. Cl.$^3$ ............... G01B 5/20; G01B 7/28; G06F 15/46
[52] U.S. Cl. ............... 364/560; 33/179.5 R; 33/179.5 D; 33/1 M
[58] Field of Search ............... 364/560, 561–563, 364/550, 556; 33/1 M, 179.5 R, 179.5 D

[56] References Cited

U.S. PATENT DOCUMENTS

| | | | |
|---|---|---|---|
| 3,741,659 | 6/1973 | Jones, Jr. | 33/179.5 R X |
| 3,849,891 | 11/1974 | Pratt et al. | 33/179.5 D |
| 3,950,858 | 4/1976 | Donner et al. | 33/179.5 R |
| 4,166,323 | 9/1979 | Maag | 33/179.5 R |
| 4,181,961 | 1/1980 | Nopper | 364/563 |
| 4,276,699 | 7/1981 | Sterki et al. | 33/179.5 R |
| 4,285,133 | 8/1981 | Sterki et al. | 33/1 M X |

Primary Examiner—Edward J. Wise
Attorney, Agent, or Firm—Werner W. Kleeman

[57] ABSTRACT

A method of determining the boundaries of a measuring path of a tooth flank-testing apparatus, wherein a measuring feeler is arranged upon a cross-slide arrangement composed of an X-slide or carriage movable in the direction of the tooth width of a test piece and a Y-slide or carriage movable in the direction of the tooth height. Each carriage has associated therewith a X-drive and Y-drive containing X-servomotor and Y-servomotor, respectively, X- and Y-position transmitter and X- and Y-position regulator. Both drives can be selectively manually controlled or by a program-controlled computer, which processes apart from signals of the position transmitter also signals delivered by the measuring feeler itself in accordance with the deflection of its measuring head and interrupts the course of the program when the deflection exceeds a predetermined value. Connected with the computer is a memory or storage for the position data of a tooth addendum point and a tooth root or base point as boundaries of the measuring path of the feeler head which moves through a random number of tooth flanks. The feeler head is moved at the tooth addendum point and tooth base point, respectively, and the position data obtained by the measuring feeler is stored. The feeler head is moved at a random location between and in spaced relationship from two tooth flanks of the test piece, then the X-position regulator is connected with the measuring feeler while circumventing the computer, the feeler head is brought into contact by movements of the X-carriage controlled by the measuring feeler at random locations of one of these tooth flanks, and thus, deflected by the predetermined value, and the feeler head then is moved, by manually controlling the Y-slide while the X-slide is controlled itself by the measuring feeler, along the tooth flank to the tooth addendum point and/or the tooth base point.

2 Claims, 5 Drawing Figures

METHOD OF DETERMINING THE BOUNDARIES OF A MEASURING PATH OF A GEAR FLANK TESTING APPARATUS AND GEAR FLANK TESTING APPARATUS FOR PERFORMANCE OF THE METHOD

BACKGROUND OF THE INVENTION

The present invention relates to a new and improved method of determining the boundaries of a measuring path of a gear flank-testing apparatus, and also pertains to a gear flank testing apparatus for the performance of such method.

Generally speaking, the method for determining the boundaries of a measuring path of a gear flank-testing apparatus is of the type wherein a measuring feeler is arranged upon a cross-slide arrangement composed of a X-slide or carriage movable in the direction of the tooth width of a test piece and Y-slide or carriage movable in the direction of the tooth height. Each such carriage has operatively associated therewith a X-drive and Y-drive together with X-servomotor and Y-servomotor, X- and Y-position transmitter and X- and Y-position regulator. Both drives can be selectively controlled manually or by a program-controlled computer, which processes, apart from signals of the position transmitter, also those of the measuring feeler itself in accordance with deflections of its feeler head and interrupts the course of the program when such deflection exceeds a predetermined value or magnitude. Additionally, connected with the computer is a storage or memory for the position data of a tooth addendum point and a tooth root or base point as boundaries of the measuring path through which moves the feeler head at a random number of tooth flanks. The feeler head is moved at the tooth addendum point and tooth root or base point, respectively, and the position data obtained by the measuring feeler at such location is stored.

With such type tooth flank-testing devices, for instance as disclosed in the German Patent application No. P 29 34 347.3 and the corresponding U.S. application Ser. No. 147,041, filed May 5, 1980, now U.S. Pat. No. 4,296,699, granted July 7, 1981 and the German Patent application No. P 29 34 412.5 and the corresponding United States application Ser. No. 111,769, filed Jan. 14, 1980, now U.S. Pat. No. 4,297,788, granted Nov. 3, 1981 the measuring feelers have a measuring range of approximately 7 to 40 microns. Hence, such constitutes extremely sensitive equipment which must be protectively handled. So as to prevent that the measuring feeler, during travel of its feeler head at a tooth flank or at another object, will be deflected beyond its measuring range, and thus, overloaded, there is insured that the computer interrupts the course of the program and shuts down all of the drives when the deflection of the measuring feeler has exceeded a predetermined value. By virtue of such unavoidable safety measures it is however possible for there to arise appreciable difficulties during the determination of the boundaries of a measuring path through which the feeler head must repeatedly pass during testing of a multiplicity of tooth flanks of a test piece or a plurality of the same test pieces. The boundaries of the measuring path, in many instances, cannot be determined simply from the tooth data, rather must first be fixed at the test piece itself before they can be introduced into the memory or storage. Therefore, it is conventional practice to carry out such determination in a manner such that the feeler head travels successively along both points of a tooth flank by manually controlling the X-drive and the Y-drive, both of these points, constituting the tooth addendum point and the tooth base point, being intended to form the boundaries of the measuring range and being determined by the user of the tooth flank-testing apparatus in a manner such that, on the one hand, there is tested the tooth flank profile as to the interesting length thereof and, on the other hand, avoiding disturbances in the automatic running of the measuring operation due to contact of the feeler head at a tooth root or base or sliding-off of the feeler head at a tooth addendum.

In many instances it has been found to be extremely difficult to exactly bring the feeler head, by manually controlling the X-drive and Y-drive, at a desired tooth root point or tooth addendum point, and thus, to ensure that the measuring feeler will be deflected at the related point within predetermined limits. If the greatest permissible deflection is exceeded, the described safety measures become effective and the entire attempt to bring the feeler head close to the contemplated tooth base point or tooth addendum point must be repeated. Such failures are even frequently encountered by trained users of prior art tooth flank-testing equipment, when it is necessary to reach by means of the feeler head a suitably appearing tooth base point at a narrow tooth gap or space, since at that location the feeler head not only can impact against the tooth flank, but also at the tooth root or base. Difficulties also can arise at such region due to the fact that the tooth root or base is undercut, and therefore precautions must be taken to prevent that the feeler head will move past the tooth flank into the undercut tooth region.

On the other hand, during the attempt to obtain the desired tooth base point or tooth addendum point, there must be prevented that the feeler head will be deflected too little at such point when the position data of both slides or carriages is stored. Too little deflection of the feeler head means that the feeler head will bear with too litle pre-bias against the tooth flank, and thus, during the subsequent scanning or feeling operation of such and further tooth flanks, it will not be capable of delivering reproducible measurement results.

SUMMARY OF THE INVENTION

Therefore, with the foregoing in mind it is a primary object of the present invention to provide a new and improved method of, and apparatus for, determining the boundaries of a measuring path of a gear flank-testing apparatus in a manner not associated with the aforementioned drawbacks and limitations of the prior art.

Another and more specific object of the present invention aims at improving upon the previously described method and providing a measuring feeler suitable for the performance thereof, in a manner such that the user is capable of realizing in a much simpler manner and with greater accuracy a selected tooth base or root point or tooth addendum point and to obtain at such location a deflection of the measuring feeler which remains within pre-determined boundaries of limits.

Now in order to implement these and still further objects of the invention, which will become more readily apparent as the description proceeds, the method of the present development contemplates that the feeler head is moved at a random location between and in spaced relationship from two tooth flanks of the test piece, then the X-position regulator is connected with the measuring feeler while circumventing the computer, the feeler head is brought into contact at a random location with one of the tooth flanks, due to movement of the X-slide controlled by the measuring feeler, and thus, deflected by the predetermined value or magnitude. Then the feeler head is moved, by manually controlling the Y-slide while further controlling the X-slide by the measuring feeler itself, along the tooth flank to the tooth addendum point and/or tooth base or root point.

It is readily possible for the user to manually control initially the Y-slide and, if needed, also the X-slide, in such a manner that the feeler head arrives at a random location, preferably approximately at the center, between two tooth flanks, without impacting against one of these tooth flanks. Then, the user of the equipment insures that the X-position regulator, while circumventing the computer, is connected with the measuring feeler. How this happens is not decisive; preferably however the described tooth flank-testing apparatus of the invention is constructed such that the X-position regulator can be connected by a change-over or reversing switch selectively with the computer or the measuring feeler. As soon as the connection of the X-position regulator with the measuring feeler has been established, and additionally, after there has been determined in conventional manner whether there should be scanned a right or a left tooth flank, the measuring feeler controls the X-drive itself.

This means that the feeler head automatically approaches the selected tooth flank and shuts down the X-drive as soon as it impacts against the tooth flank and has been deflected thereby through the predetermined magnitude. If the user of the equipment now manually controls the Y-slide or carriage in the one or other direction, then the measuring feeler guides the X-slide automatically in the positive or negative X-direction such that the deflection of the feeler head is maintained. The user or operator need not particularly concern himself about such deflection and the X-slide and can completely concentrate upon the manually controlled movements of the Y-slide and the corresponding movements of the feeler head which the operator performs.

Therefore, it is a simple matter for the operator to obtain the desired tooth base point or tooth addendum point. As soon as this occurs, the operator need only insure that, for instance by pressing a key or button, the position data of the feeler head is stored in the normal fashion, so that it will be detected later on by the computer, during scanning of the tooth flanks, in each case as boundaries of the measuring path.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
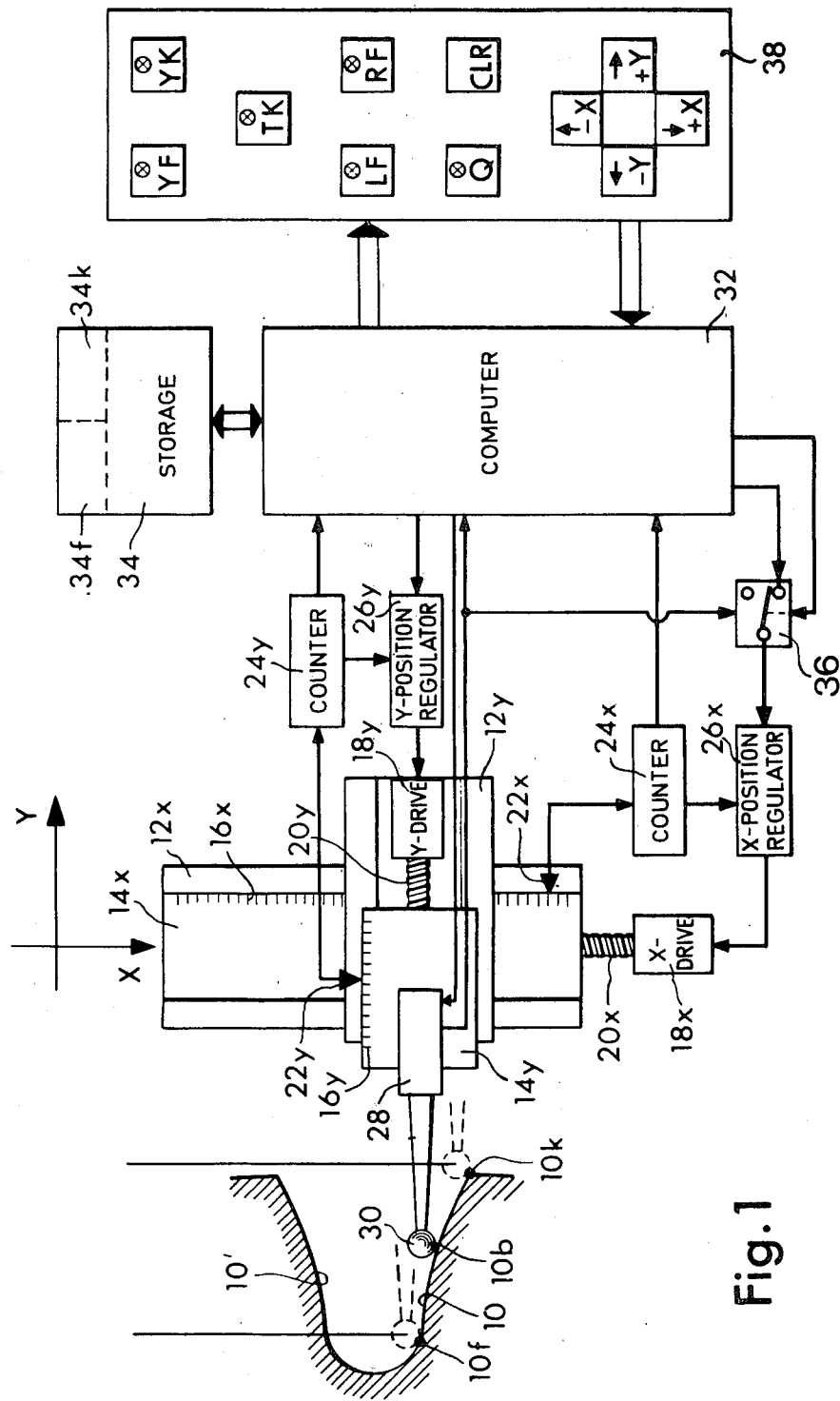
FIG. 1 is a schematic view of an inventive tooth flank-testing apparatus with related block circuit diagram of the electronic portion of the equipment.
Figure 2A:
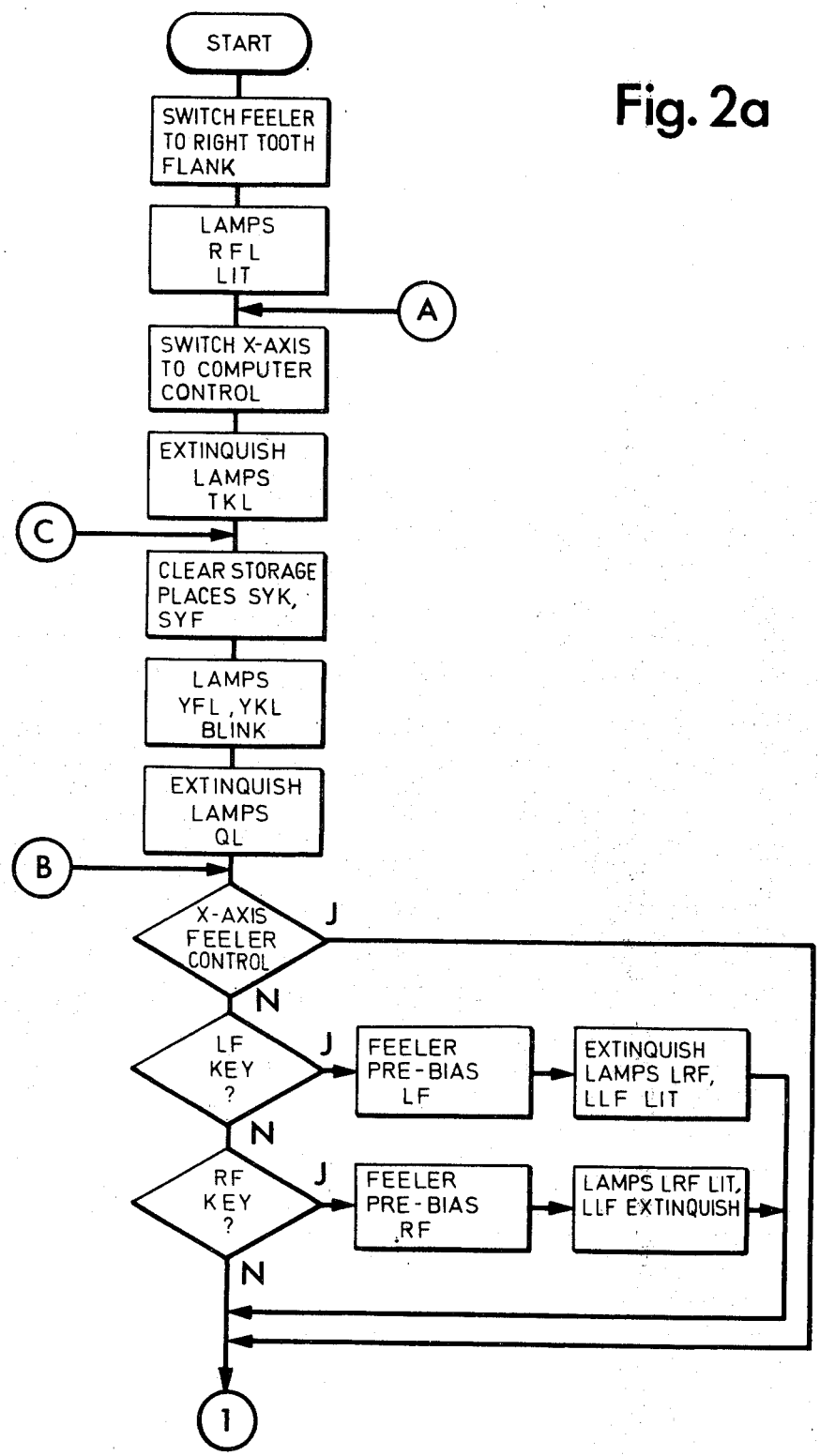
FIGS. 2a, 2b, 2c and 2d illustrate a computer program for the automatic performance of the inventive method with the illustrated tooth flank-testing apparatus of FIG. 1.
Figure 2B:
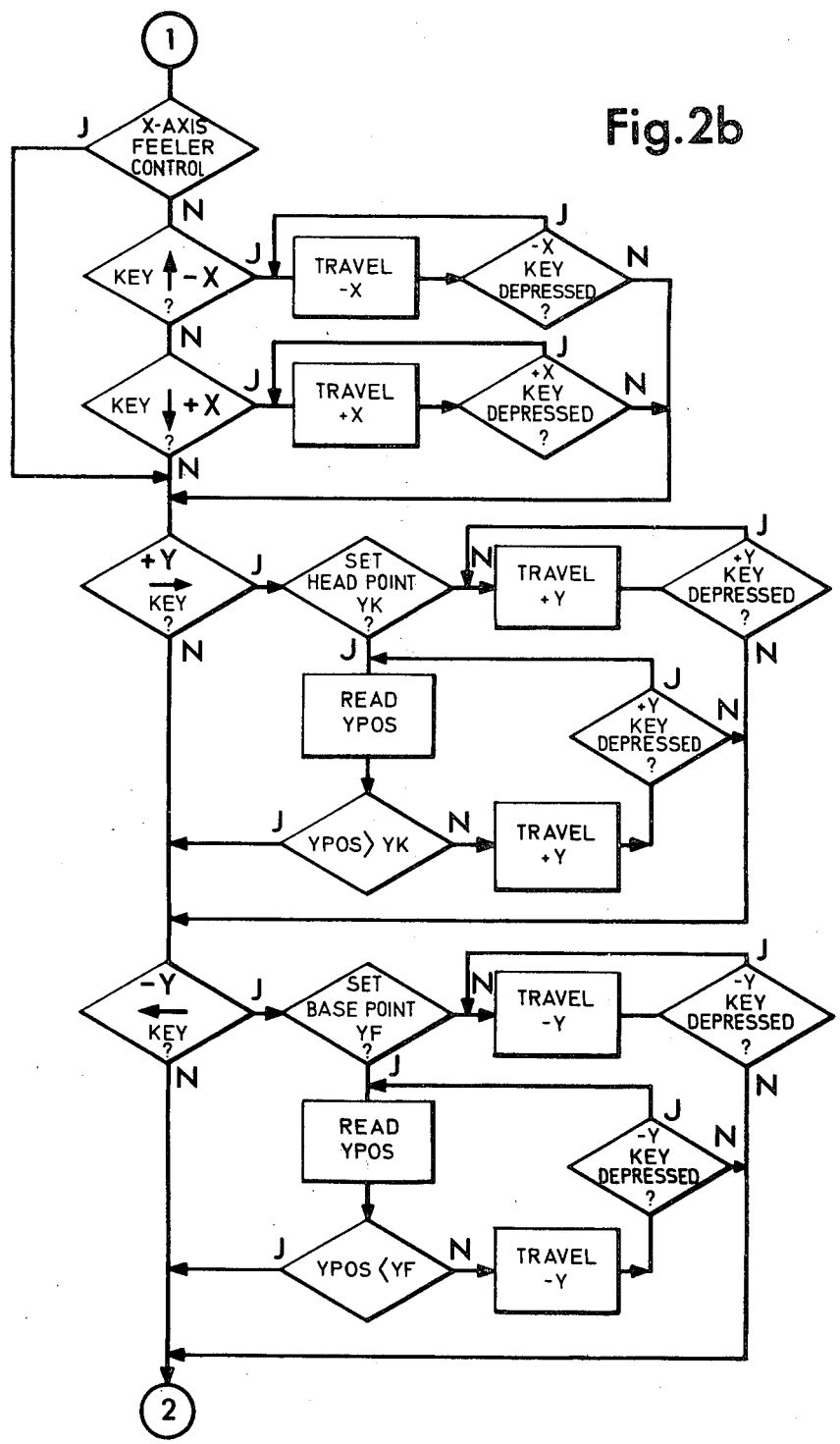
Figure 2C:
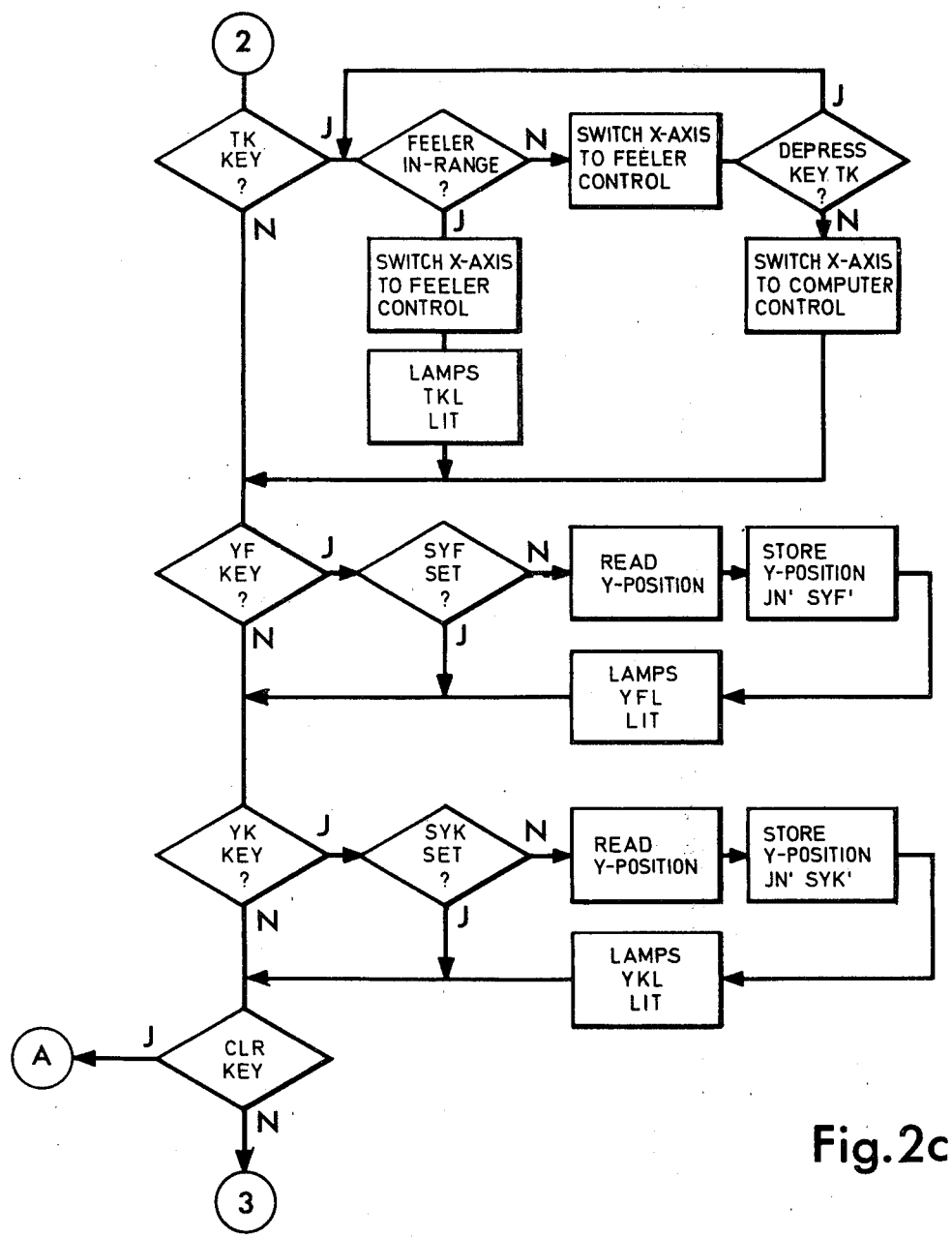
Figure 2D:
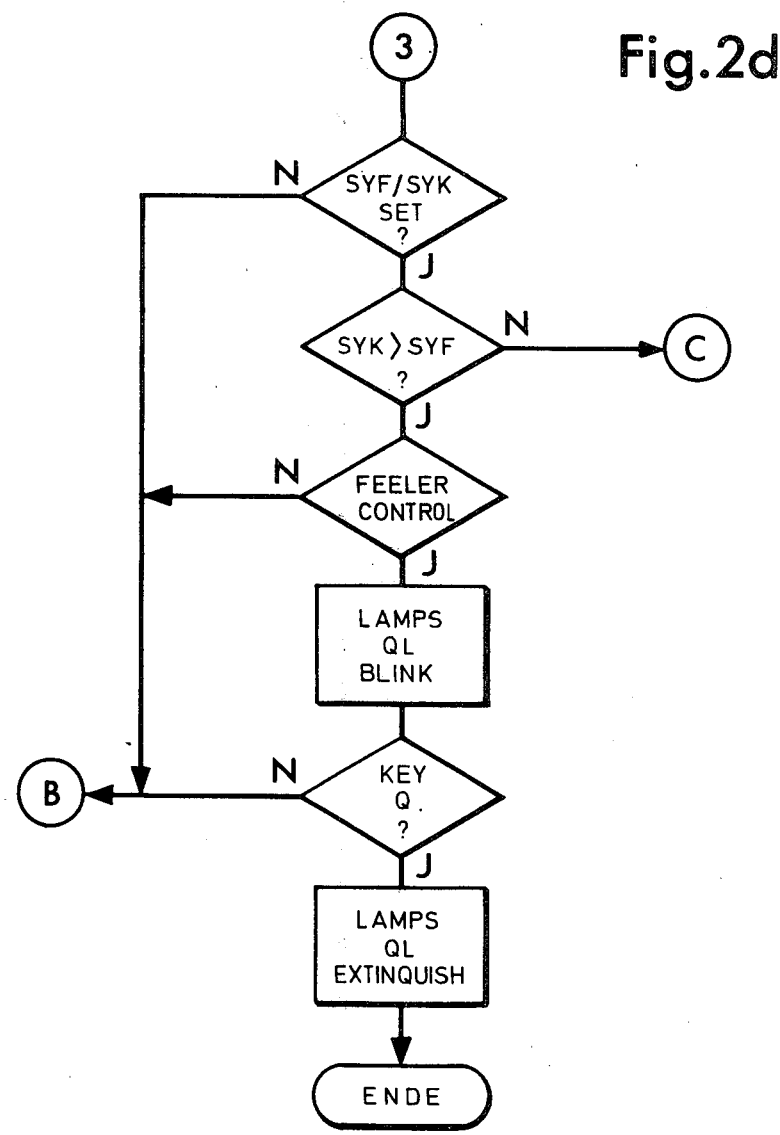

Turning now to the drawings, in FIG. 1 there has been illustrated, as to the teeth of a test piece or gear which is to be tested, a left tooth flank 10 and a right tooth flank 10'. At one of these tooth flanks there should be determined position data of a tooth base or root point 10f and a tooth addendum point 10k as boundaries of a measuring path M and such data stored.

The illustrated tooth flank-testing apparatus has a guide or guide means 12x which extends in a direction X which is tangential with respect to the teeth, and therefore has been conveniently designated in this disclosure as the X-guide or guide means. Guided upon the X-guide means 12x is a X-slide or carriage 14x possesing a graduated scale 16x and is shiftable or displaceable by a X-drive 18x by means of a threaded spindle 20x. Arranged at the X-guide 12x is a position transmitter 22x which is connected by means of a counter 24x at a position regulator 26x. Arranged upon the X-slide or carriage 14x is a Y-guide or guide means 12y, which extends radially in the direction of the arrow Y in relation to the teeth to be tested, in other words at right angles to the X-guide or guide means 12x. This Y-guide 12y carries a Y-slide or carriage 14y having a scale 16y and displaceable by a Y-drive 18y by means of a threaded spindle 20y. The scale 16y is operatively associated with a position transmitter 22y which is connected by means of a counter 24y at a Y-position regulator 26y.

Arranged upon the Y-slide or carriage 14y is a measuring feeler or scanner 28 having a deflectable, spherical or ball-shaped feeler head 30.

Counters 24x and 24y as well as the measuring feeler 28 are connected with a computer 32 with which there is operatively associated a storage or memory 34 for data and programs. The memory 34 contains, among other things, storage places 34f and 34k for the position data, delivered by the position transmitters 22x and 22y, when the feeler head 30 bears against the tooth base or root point 10f and the tooth addendum point 10k, respectively, and thus has been deflected by a predetermined value or magnitude. The computer 32 is directly connected with the Y-position regulator 26y which regulates the operation of the Y-drive 18y. Connected with the computer 32 is a change-over or reversing switch 36 which selectively connects the X-position regulator 26x with the computer 32 or with the measuring feeler 28 and, in turn, can be controlled by means of the computer 32.

Finally, there is connected with the computer 32 a control panel or keyboard 38 having the following keys:

Key YF Serves for the command to store the position of the Y-slide as ordinate of the tooth root or base point 10f;

Key YK Serves for the command to store the position of the Y-slide as ordinate of the tooth addendum point 10k;

Key TK Serves for the command to bring the change-over switch out of the position of FIG. 1 into the position where the signals of the measuring feeler 28 are infed to the X-position regulator 26x while circumventing the computer 32;

Key LF Serves for the command to scan the left tooth flank 10;

Key RF Serves for the command to scan the right tooth flank 10';

Key Q Constitutes an acknowledgment key;
Key CLR Constitutes the extinguishing key;
Keys±X Serve for manually controlled movements of the X-slide 14x in the direction ±X; and
Keys±Y Serve for the manually controlled movement of the Y-slide 14y in the direction ±Y.

While there are shown and described present preferred embodiments of the invention, it is to be distinctly understood that the invention is not limited thereto, but may be otherwise variously embodied and practiced within the scope of the following claims. Accordingly,

What I claim is:

1. In a method for determining the boundaries of a measuring path of a tooth flank-testing apparatus, wherein a measuring feeler is arranged upon a cross-slide arrangement composed of a X-slide movable in the direction of the tooth width of a test piece and a Y-slide movable in the direction of the tooth height, each such slide having operatively associated therewith a X-drive and Y-drive with X-servomotor and Y-servomotor, respectively, an X-position transmitter and Y-position transmitter and X-position regulator and Y-position regulator, both drives being selectively manually controllable or by a program-controlled computer, which processes apart from signals of the position transmitters also signals delivered by the measuring feeler itself in accordance with the deflection of a measuring head of the measuring feeler and interrupts the course of the computer program when the deflection exceeds a predetermined value, there being connected with the computer a storage for the position data of a tooth addendum point and a tooth base point as boundaries of the measuring path through which moves the feeler head at a random number of tooth flanks, the feeler head being moved along the tooth addendum point or the tooth base point, respectively, and the position data determined at such location by the measuring feeler being stored, the improvement which comprises:

moving the feeler head at a random position between and in spaced relationship from two tooth flanks of the test piece;
   then connecting the X-position regulator with the measuring feeler while circumventing the computer;
   placing the feeler head into contact with a random location of one of the tooth flanks by movements of the X-slide controlled by the measuring feeler, and thereby deflecting such measuring feeler through the predetermined value; and
   moving the feeler head, by manual control of the Y-carriage while further controlling the X-carriage by the measuring feeler itself, along the tooth flank to at least any one of the tooth addendum point or tooth base point.

2. A tooth flank-testing apparatus for determining the boundaries of a measuring path of the tooth flank-testing apparatus, comprising:
   a measuring feeler;
   a cross-slide arrangement at which there is arranged said measuring feeler;
   said cross-slide arrangement comprising a X-slide movable in the direction of the tooth width of a test piece and a Y-slide movable in the direction of the tooth height of the test piece;
   an X-drive for moving said X-slide and which comprises:
      an X-servomotor;
      an X-position transmitter;
      an X-position regulator;
   a Y-drive for moving said Y-slide and which comprises:
      a Y-servomotor;
      a Y-position transmitter; and
      a Y-position regulator;
   both drives being selectively manually controllable or by means of a program-controlled computer;
   said computer processing, apart from signals delivered by the position transmitters, also signals delivered by the measuring feeler itself in accordance with the deflection of its measuring head and interrupting the course of the computer program when the deflection exceeds a predetermined value;
   storage means operatively connected with said computer for storage of position data of a tooth addendum point and a tooth base point as boundaries of a measuring path through which moves the feeler head along random number of tooth flanks; and
   change-over switch means for selectively connecting the X-position regulator with the computer or the measuring feeler.

* * * * *